United States Patent
Kim

(10) Patent No.: US 11,305,813 B2
(45) Date of Patent: Apr. 19, 2022

(54) EMERGENCY STEERING APPARATUS AND METHOD OF MOTOR DRIVEN POWER STEERING SYSTEM

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 235 days.

(21) Appl. No.: 16/448,406

(22) Filed: Jun. 21, 2019

(65) Prior Publication Data
US 2019/0389509 A1    Dec. 26, 2019

(30) Foreign Application Priority Data

Jun. 22, 2018 (KR) .................. 10-2018-0072045

(51) Int. Cl.
*B62D 6/00* (2006.01)
*B62D 5/04* (2006.01)

(52) U.S. Cl.
CPC ............. *B62D 6/00* (2013.01); *B62D 5/0463* (2013.01)

(58) Field of Classification Search
CPC .................................................. B62D 5/0463
See application file for complete search history.

(56) References Cited

U.S. PATENT DOCUMENTS

| 8,977,433 | B2* | 3/2015 | Kojima | B62D 6/00 |
| | | | | 701/41 |
| 2009/0271074 | A1* | 10/2009 | Hulten | B62D 6/003 |
| | | | | 701/42 |
| 2010/0017064 | A1* | 1/2010 | Kojima | B62D 5/0457 |
| | | | | 701/42 |
| 2016/0368530 | A1* | 12/2016 | Chang | B62D 5/0463 |
| 2017/0072996 | A1* | 3/2017 | Hong | B62D 5/0484 |
| 2017/0096161 | A1* | 4/2017 | Ko | B62D 5/046 |
| 2017/0232998 | A1* | 8/2017 | Ramanujam | B62D 6/003 |
| | | | | 701/42 |

(Continued)

FOREIGN PATENT DOCUMENTS

| CN | 102712340 | 10/2012 |
| CN | 105501289 | 4/2016 |

(Continued)

OTHER PUBLICATIONS

Office Action of corresponding Korean Patent Application No. 10-2018-0072045—11 pages (dated Jul. 1, 2019).

(Continued)

*Primary Examiner* — Jeff A Burke
*Assistant Examiner* — Jerrod Irvin Davis
(74) *Attorney, Agent, or Firm* — DLA Piper LLP (US)

(57) ABSTRACT

An emergency steering apparatus of an MDPS (Motor Driven Power Steering) system may include: a steering angle sensor configured to sense a steering angle of a steering wheel; a vehicle speed sensor configured to sense a vehicle speed; an assist rack force detector configured to detect an assist rack force of the MDPS system using the steering angle sensed by the steering angle sensor and the vehicle speed sensed by the vehicle speed sensor; and a command current detector configured to detect a command current of a motor using the assist rack force detected by the assist rack force detector

20 Claims, 5 Drawing Sheets

(56) References Cited

U.S. PATENT DOCUMENTS

2017/0355396 A1* 12/2017 Varunjikar ............. B62D 5/049
2018/0297630 A1* 10/2018 Kim ........................ B62D 3/12
2019/0039639 A1*  2/2019 Park ........................ B62D 6/00

FOREIGN PATENT DOCUMENTS

| CN | 107499372 | 12/2017 |
| JP | 2009-006985 A | 1/2009 |
| KR | 10-0827689 B1 | 4/2008 |
| KR | 2009-0022576 | 3/2009 |
| KR | 10-1316421 B1 | 10/2013 |
| KR | 10-1639479 B1 | 7/2016 |
| KR | 10-2017-0019669 A | 2/2017 |
| KR | 10-1765625 B1 | 8/2017 |

OTHER PUBLICATIONS

Chinese Office Action dated Jul. 28, 2021 issued in CN Application No. 201910507787.3.

* cited by examiner

EMERGENCY STEERING APPARATUS AND METHOD OF MOTOR DRIVEN POWER STEERING SYSTEM

CROSS-REFERENCES TO RELATED APPLICATIONS

The present application claims priority to Korean application number 10-2018-0072045, filed on Jun. 22, 2018, which is incorporated by reference in its entirety.

BACKGROUND OF THE INVENTION

The present invention relates to an emergency steering apparatus and method of a motor driven power steering (MDPS) system, and more particularly, to an emergency steering apparatus and method of an MDPS system, which can assure a driver's safety by maintaining a steering force even when a torque sensor of the MDPS system fails.

The MDPS system of a vehicle enables a driver to easily steer the vehicle by providing a part of steering torque which the driver needs to apply to a steering wheel when steering the vehicle, using an auxiliary power source.

The MDPS system determines driving conditions of the vehicle through a torque sensor to measure the driver's steering torque inputted to the steering wheel, a steering angle sensor to measure a steering angle or steering angular velocity of the steering wheel, and a vehicle speed sensor to measure a vehicle speed, and provides assist torque through an electric motor based on steering torque applied to a steering shaft when the driver operates the steering wheel.

In particular, when the torque sensor fails, the steering function may not normally operate.

In the related art, when the torque sensor fails, a fail safety function for the safety of the vehicle is operated to forcibly suspend the steering function, or the MDPS system generates an abnormal assist steering force regardless of a driver's steering intention. In this case, the driver may be put into a dangerous situation.

The related art of the present invention is closed in Korean Patent Registration No. 10-1765625 published on Aug. 1, 2017 and entitled "Torque control apparatus and method of MDPS system".

SUMMARY OF THE INVENTION

Embodiments of the present invention are directed to an emergency steering apparatus and method of an MDPS system, which can assure a driver's safety by maintaining a steering force even when a torque sensor of the MDPS system fails.

In one embodiment, an emergency steering apparatus of an MDPS (Motor Driven Power Steering) system may include: a steering angle sensor configured to sense a steering angle of a steering wheel; a vehicle speed sensor configured to sense a vehicle speed; an assist rack force detector configured to detect an assist rack force of the MDPS system using the steering angle sensed by the steering angle sensor and the vehicle speed sensed by the vehicle speed sensor; and a command current detector configured to detect a command current of a motor using the assist rack force detected by the assist rack force detector.

The assist rack force detector may include: a total rack force calculator configured to calculate a total rack force required for a driver to operate a steering wheel, using the steering angle sensed by the steering angle sensor and the vehicle speed sensed by the vehicle speed sensor; and an assist rack force calculator configured to calculate the assist rack force based on the total rack force calculated by the total rack force calculator and a driver max steering force.

The total rack force calculator may calculate a side slip angle and yaw rate of the vehicle, using the steering angle sensed by the steering angle sensor and the vehicle speed sensed by the vehicle speed sensor, calculate self-aligning torque based on the detected side slip angle and yaw rate of the vehicle, and then calculate the total rack force based on the calculated self-aligning force.

The emergency steering apparatus may further include a command current corrector configured to correct a command current according to the yaw rate calculated by the total rack force calculator.

The command current corrector may compare the yaw rate calculated by the total rack force calculator to the yaw rate sensed by the yaw rate sensor, and adjust the magnitude of the command current according to the comparison result.

The command current corrector may compare patterns or magnitudes of the yaw rate calculated by the total rack force calculator and the yaw rate sensed by the yaw rate sensor, and determine a behavior of the vehicle as any one of normal turn, over-steer and under-steer, according to a similarity therebetween.

The command current corrector may determine that the behavior of the vehicle is over-steer, when the yaw rate sensed by the yaw rate sensor is larger than the yaw rate calculated by the total rack force calculator, and determine that the behavior of the vehicle is under-steer, when the yaw rate sensed by the yaw rate sensor is smaller than the yaw rate calculated by the total rack force calculator.

The command current corrector may adjust the magnitude of the command current by applying a difference between the yaw rate calculated by the total rack force calculator and the yaw rate sensed by the yaw rate sensor to a preset tuning map.

The assist rack force calculator may calculate the ratio of the assist rack force with respect to the total rack force calculated by the total rack force calculator, in order to calculate the assist rack force.

The assist rack force calculator may calculate the assist rack force by multiplying the ratio of the assist rack force by the total rack force calculated by the total rack force calculator.

The emergency steering apparatus may further include a command current corrector configured to previously store a gain adjustment table based on the vehicle speed sensed by the vehicle speed sensor, and correct the command current detected by the command current detector by applying a gain of the gain adjustment table according to the vehicle speed sensed by the vehicle speed sensor.

In another embodiment, an emergency steering method of an MDPS system may include: calculating, by an assist rack force detector, a total rack force required for a driver to operate a steering wheel, using a steering angle and vehicle speed which are sensed by a steering angle sensor and a vehicle speed sensor, respectively, and calculating an assist rack force based on the calculated total rack force and a driver max steering force; and detecting, by a command current detector, a command current of a motor using the assist rack force detected by the assist rack force detector.

In the calculating of the total rack force, a total rack force calculator may calculate a side slip angle and yaw rate of the vehicle, using the steering angle sensed by the steering angle sensor and the vehicle speed sensed by the vehicle speed sensor, calculate self-aligning torque based on the detected side slip angle and yaw rate of the vehicle, and then calculate the total rack force based on the calculated self-aligning force.

The emergency steering method may further include correcting, by a command current corrector, a command current according to the yaw rate calculated by the total rack force calculator.

In the correcting of the command current, the command current corrector may compare the yaw rate calculated by the total rack force calculator and the yaw rate sensed by the yaw rate sensor, and adjust the magnitude of the command current according to the comparison result.

In the correcting of the command current, the command current corrector may compare patterns or magnitudes of the yaw rate calculated by the total rack force calculator to the yaw rate sensed by the yaw rate sensor, and determine a behavior of the vehicle as any one of normal turn, over-steer and under-steer, according to a similarity therebetween.

In the correcting of the command current, the command current corrector may determine that the behavior of the vehicle is over-steer, when the yaw rate sensed by the yaw rate sensor is larger than the yaw rate calculated by the total rack force calculator, and determine that the behavior of the vehicle is under-steer when the yaw rate sensed by the yaw rate sensor is smaller than the yaw rate calculated by the total rack force calculator.

In the correcting of the command current, the command current corrector may adjust the magnitude of the command current by applying a difference between the yaw rate calculated by the total rack force calculator and the yaw rate sensed by the yaw rate sensor to a preset tuning map.

In the calculating of the assist rack force, the assist rack force calculator may calculate the ratio of the assist rack force with respect to the total rack force calculated by the total rack force calculator, in order to calculate the assist rack force.

In the calculating of the assist rack force, the assist rack force calculator may calculate the assist rack force by multiplying the ratio of the assist rack force by the total rack force calculated by the total rack force calculator.

The emergency steering method may further include previously storing, by a command current corrector, a gain adjustment table based on the vehicle speed sensed by the vehicle speed sensor, and correcting the command current detected by the command current detector by applying a gain of the gain adjustment table according to the vehicle speed sensed by the vehicle speed sensor.

DESCRIPTION OF SPECIFIC EMBODIMENTS

Figure 1:
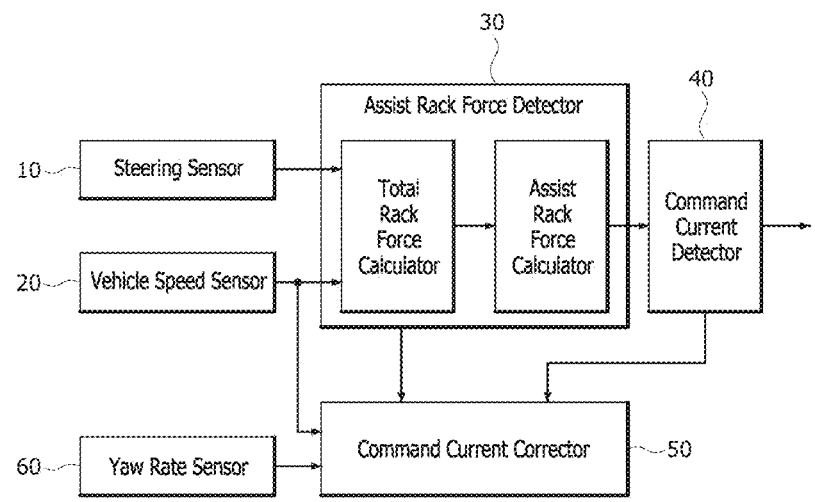
FIG. 1 is a block diagram illustrating an emergency steering apparatus of an MDPS system in accordance with an embodiment of the present invention.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, an emergency steering apparatus and method of a motor driven power steering (MDPS) system in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
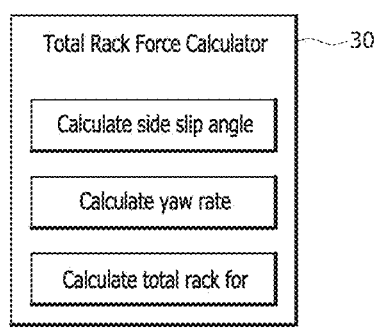
FIG. 2 illustrates an operation of a total rack force calculator in accordance with the embodiment of the present invention.
Figure 3:
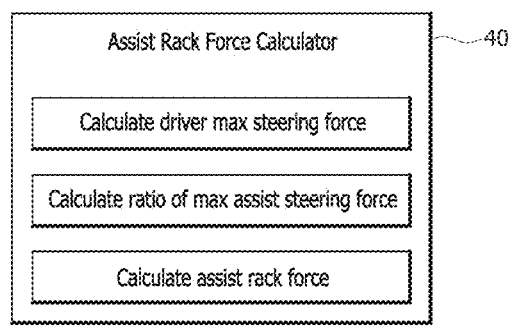
FIG. 3 illustrates an operation of an assist rack force calculator in accordance with the embodiment of the present invention.

FIG. 1 is a block diagram illustrating an emergency steering apparatus of an MDPS system in accordance with an embodiment of the present invention, FIG. 2 illustrates an operation of a total rack force calculator in accordance with the embodiment of the present invention, and FIG. 3 illustrates an operation of an assist rack force calculator in accordance with the embodiment of the present invention.

Referring to FIG. 1, the emergency steering apparatus of an MDPS system in accordance with the embodiment of the present invention may include a steering angle sensor 10, a vehicle speed sensor 20, an assist rack force detector 30, a command current detector 40 and a command current corrector 50.

The steering angle sensor 10 may sense a steering angle of a steering wheel operated by a driver.

The vehicle speed sensor 20 may sense a vehicle speed.

The assist rack force detector 30 may detect an assist rack force of the MDPS system using the steering angle sensed by the steering angle sensor 10 and the vehicle speed sensed by the vehicle speed sensor 20. That is, when an error occurs in a torque sensor of the MDPS system, the assist rack force detector 30 may detect an assist rack force of the MDPS system using the steering angle sensed by the steering angle sensor 10 and the vehicle speed sensed by the vehicle speed sensor 20, such that a steering force can be maintained even when the torque sensor fails.

The assist rack force detector 30 may include a total rack force calculator 31 and an assist rack force calculator 32.

Referring to FIG. 2, the total rack force calculator 31 may calculate a total rack force required for the driver to operate the steering wheel, using the steering angle and the vehicle speed which are sensed by the steering angle sensor 10 and the vehicle speed sensor 20, respectively.

For this operation, the total rack force calculator 31 may calculate a side slip angle and yaw rate of the vehicle through vehicle modeling and dynamics, using the steering angle and the vehicle speed which are sensed by the steering angle sensor 10 and the vehicle speed sensor 20, respectively, based on Equation 1 below.

$$mV\left(\frac{dB}{dt}\right) + 2(Kf + Kr)B +$$

$$\left(mV + \frac{2}{V(lf \times Kf - lr \times Kr)}\right)r = 2Kf \times \delta$$

$$2(lfKf - lrKr)B + I \times \left(\frac{dr}{dt}\right) + \left(2\left(\frac{lf^2 \times Kf - lr^2 \times Kr}{V}\right)\right) \times r =$$

$$2lf \times Kf \times \delta$$

[Equation 1]

In Equation 1, m represents the weight of the vehicle, V represents the vehicle speed, B represents the side slip angle of the vehicle, Kf represents cornering stiffness of a front wheel, Kr represents cornering stiffness of a rear wheel, If represents the distance from the center of the vehicle to the front wheel, Ir represents the distance from the center of the vehicle to the rear wheel, δ represents the steering angle, I represents the total length of the vehicle, and r represents the yaw rate.

When the side slip angle and yaw rate of the vehicle are calculated through the steering angle and the vehicle speed as described above, the total rack force calculator 31 may calculate self-aligning torque of the vehicle, using the weight and speed of the vehicle and the slip angle and yaw rate of the vehicle, under the supposition that the side slip angles and the cornering forces of the left and right tires of the vehicle are equal to each other.

Since the self-aligning torque has a similar pattern and magnitude to a rack force which is actually required for a driver to operate the steering wheel in a general road condition, the total rack force calculator 31 may calculate the total rack force required for the driver to operate the steering wheel, based on the self-aligning torque.

Referring to FIG. 3, the assist rack force calculator 32 may calculate an assist rack force based on the total rack force detected by the total rack force calculator 31 and a driver max steering force.

Since the self-aligning torque has a similar magnitude to the total rack force required for the driver to operate the steering wheel, an assist steering force of the MDPS system may be actually calculated by subtracting the driver's force from an actual total rack force required for the vehicle, in consideration of the self-aligning torque.

That is, since the total rack force is the sum of the assist steering force of the MDPS system and the driver steering force, the assist steering force of the MDPS system may be calculated by subtracting the driver steering force from the total rack force.

At this time, the assist rack force calculator 32 may calculate the driver max steering force using n_pinion efficiency, driver max torque and a pinion gear ratio.

As the driver max steering force is calculated, the assist rack force calculator 32 may detect the ratio of the total rack force derived through the characteristics of the vehicle to the driver max steering force. Then, the assist rack force calculator 32 may calculate the assist steering force which the MDPS system needs to actually provide, by multiplying the ratio by the required rack force.

That is, the assist rack force calculator 32 may calculate the max assist steering force of the MDPS system by subtracting the driver max steering force from the required max rack force in which the vehicle characteristics are considered. In this case, the ratio of the assist rack force of the MDPS system may be derived by dividing the max steering force of the MDPS system by the required max rack force in which the vehicle characteristics are considered.

The ratio of the assist rack force may be obtained by subtracting the driver max steering force from the max rack force required for turning the wheels of the vehicle and dividing the result value by the max rack force required for turning the wheels of the vehicle.

Then, the assist rack force calculator 32 may calculate the final assist rack force of the MDPS system, which is actually required, by multiplying the ratio of the assist rack force of the MDPS system by the required rack force.

That is, the assist rack force calculator 32 may calculate the actually required final assist rack force of the MDPS system by multiplying the ratio of the assist rack force of the MDPS system in the required max rack force by a current required rack force calculated through vehicle modeling and dynamics.

Therefore, the driver needs to add a steering force required by the driver. When the driver operates the steering wheel in a normal state, heaviness may occur to cause the driver to have a road feel, while a sense of difference such as looseness is reduced.

The command current detector 40 may detect a command current of a motor using the assist rack force detected by the assist rack force detector 30. In this case, the command current detector 40 may detect the current command of the motor using one or more of the assist rack force ratio of the MDPS system, a ball screw lead, a belt puller decelerator ratio, belt pulley ratio efficiency and ball screw efficiency.

The command current corrector 50 may correct the command current according to the vehicle speed or the yaw rate calculated by the total rack force calculator 31.

That is, the command current corrector 50 may compare the yaw rate calculated by the total rack force calculator 31 to the yaw rate sensed by the yaw rate sensor 60, and adjust the magnitude of the command current according to the comparison result.

In this case, the command current corrector 50 may compare the patterns or magnitudes of the yaw rate calculated by the total rack force calculator 31 and the yaw rate sensed by the yaw rate sensor 60, and determine a behavior of the vehicle as one of a normal turn, over-steer and under-steer, according to the similarity therebetween.

For example, the command current corrector 50 may determine that the behavior of the vehicle is over-steer, when the yaw rate sensed by the yaw rate sensor 60 is larger than the yaw rate calculated by the total rack force calculator 31, and determine that the behavior of the vehicle is under-steer, when the yaw rate sensed by the yaw rate sensor 60 is smaller than the yaw rate calculated by the total rack force calculator 31.

In this case, the command current corrector 50 may adjust the magnitude of the command current by applying a difference between the yaw rate calculated by the total rack force calculator 31 and the yaw rate sensed by the yaw rate sensor 60 to a preset tuning map.

Alternatively, the command current corrector 50 may correct the command current using the vehicle speed sensed by the vehicle speed sensor 20. That is, the command current corrector 50 may previously store a gain adjustment table based on the speed sensed by the vehicle speed sensor 20, and correct the command current by applying a gain of the gain adjustment table according to the speed sensed by the vehicle speed sensor 20. In this case, as the speed is higher, the command current corrector 50 may apply a lower value to reduce the command current.

Hereafter, an emergency steering method of an MDPS system in accordance with an embodiment of the present invention will be described with reference to FIG. 4.

Figure 4:
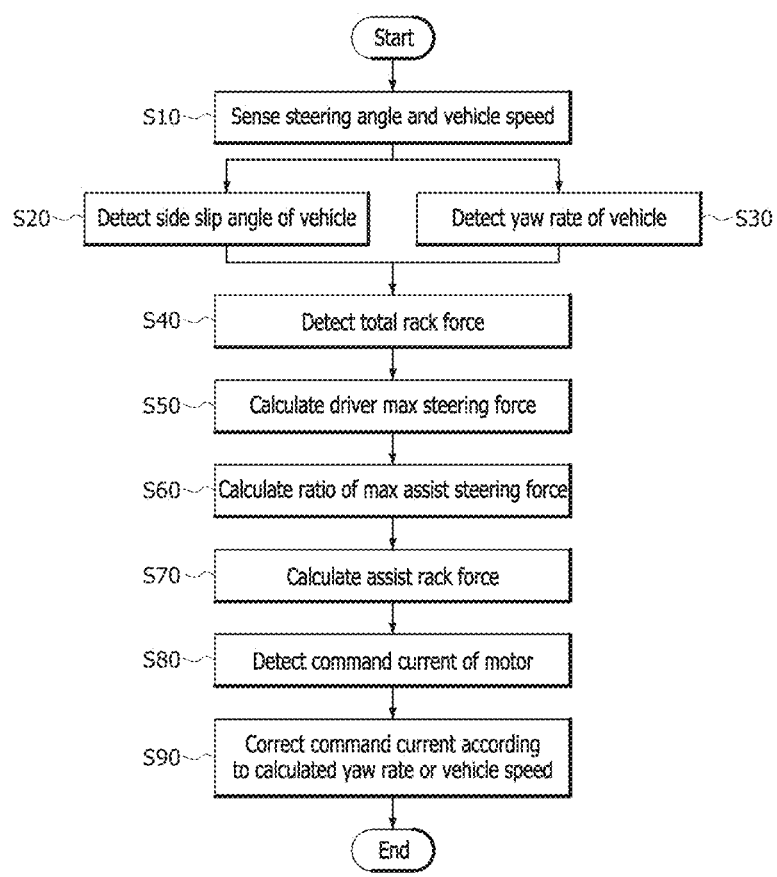
FIG. 4 is a flowchart illustrating an emergency steering method of an MDPS system in accordance with an embodiment of the present invention.

FIG. 4 is a flowchart illustrating an emergency steering method of an MDPS system in accordance with an embodiment of the present invention.

Referring to FIG. 4, the steering angle sensor 10 may sense a steering angle of the steering wheel operated by a driver, and the vehicle speed sensor 20 may sense the speed of the vehicle at step S10.

As the steering angle and the vehicle speed are sensed, the assist rack force detector 30 may calculate a side slip angle and yaw rate of the vehicle through vehicle modeling and dynamics, using the steering angle and the vehicle speed which are sensed by the steering angle sensor 10 and the vehicle speed sensor 20, respectively, at steps S20 and S30.

Then, when the side slip angle and the yaw rate are calculated by the assist rack force detector 30, the total rack force calculator 31 may calculate self-aligning torque of the vehicle using the side slip angle and the yaw rate of the vehicle, under the supposition that side slip angles and cornering forces of the left and right tires of the vehicle are equal to each other.

Since the self-aligning torque has a similar pattern and magnitude to a rack force which is actually required for the driver to operate the steering wheel in a general road condition, the total rack force calculator 31 may calculate a total rack force required for the driver to steer the steering wheel, based on the self-aligning torque, at step S40.

In this case, since the total rack force is the sum of the assist steering force of the MDPS system and the driver steering force, the assist steering force of the MDPS system may be calculated by subtracting the driver steering force from the total rack force.

Then, the assist rack force detector 30 may calculate the driver max steering force at step S50, calculate the ratio of the total rack force derived through the characteristics of the vehicle and the driver max steering force at step S60, and calculate an assist rack force which the MDPS system needs to actually provide, by multiplying the ratio by the required rack force, at step S70.

That is, the assist rack force calculator 32 may calculate the max assist steering force of the MDPS system by subtracting the driver max steering force from the required max rack force in which the characteristics of the vehicle are considered, and calculate the ratio of the assist rack force of the MDPS system in the max required rack force by dividing the value obtained by subtracting the driver max steering force from the max rack force required for turning the wheels of the vehicle by the max rack force required for turning the wheels.

Then, the assist rack force calculator 32 may calculate the final assist rack force of the MDPS, which is actually required, by multiplying the ratio of the assist rack force of the MDPS system in the max required rack force by the required rack force.

That is, the assist rack force calculator 32 may calculate the actually required final assist rack force of the MDPS system by multiplying the ratio of the assist rack force of the MDPS system in the required max rack force by a current required rack force calculated through vehicle modeling and dynamics.

As the assist rack force is calculated, the command current detector 40 may detect a command current of the motor using the assist rack force detected by the assist rack force detector 30 at step S80.

When the command current of the motor is detected by the command current detector 40, the command current corrector 50 may correct the command current according to the vehicle speed or the yaw rate calculated through the total rack force calculator 31 at step S90.

In this case, the command current corrector 50 may compare the patterns or magnitudes of the yaw rate calculated by the total rack force calculator 31 and the yaw rate sensed by the yaw rate sensor 60, and determine a behavior of the vehicle as one of normal turn, over-steer and under-steer, based on the similarity therebetween. That is, the command current corrector 50 may determine that the behavior of the vehicle is over-steer, when the yaw rate sensed by the yaw rate sensor 60 is larger than the yaw rate calculated by the total rack force calculator 31, and determine that the behavior of the vehicle is under-steer, when the yaw rate sensed by the yaw rate sensor 60 is smaller than the yaw rate calculated by the total rack force calculator 31.

At this time, the command current corrector 50 may adjust the magnitude of the command current by applying a difference between the yaw rate calculated by the total rack force calculator 31 and the yaw rate sensed by the yaw rate sensor 60 to the preset tuning map.

Alternatively, the command current corrector 50 may previously store a gain adjustment table based on the speed sensed by the vehicle speed sensor 20, and correct the command current by applying a gain of the gain adjustment table according to the speed sensed by the vehicle speed sensor 20. In this case, as the vehicle speed is higher, the command current corrector 50 may apply a lower gain to reduce the command current.

Figure 5:
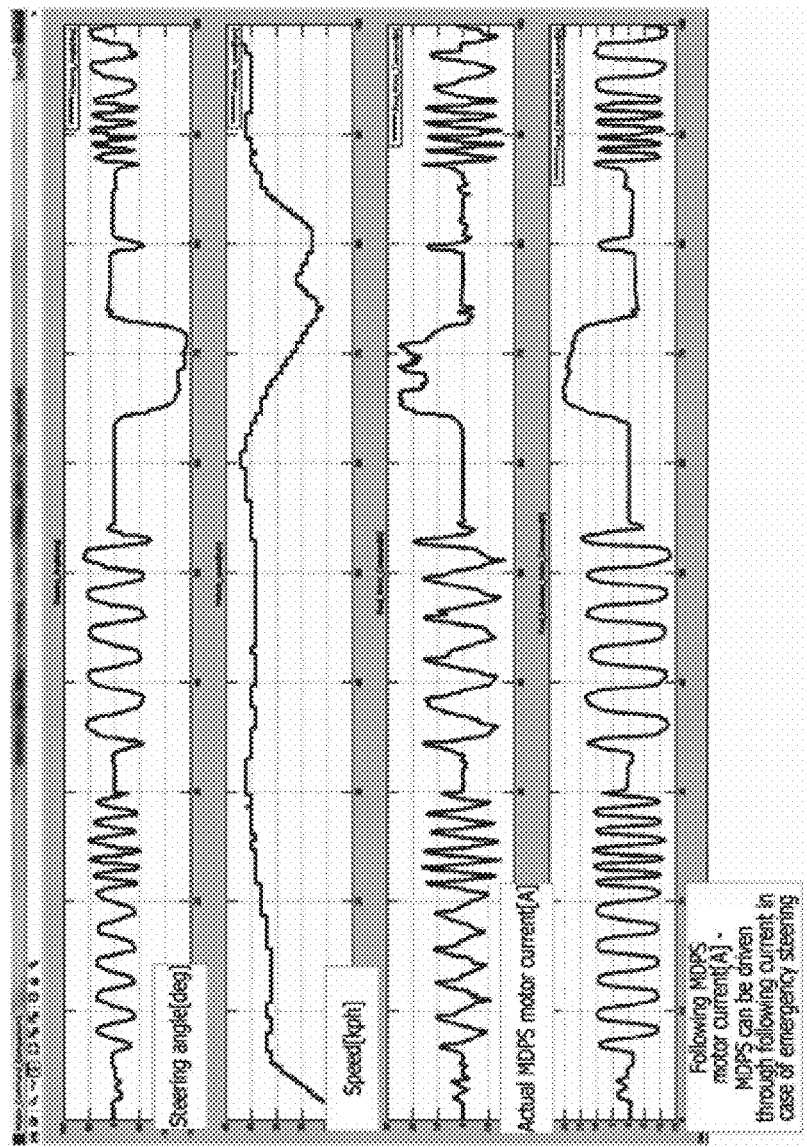
FIG. 5 illustrates a simulation result in accordance with the embodiment of the present invention.

FIG. 5 illustrates a simulation result in accordance with the embodiment of the present invention.

FIG. 5 shows that, when a steering angle and vehicle speed are sensed, a motor command current in the case that the torque sensor normally operates (actual MDPS motor current [A]) and a motor command current in case of emergency steering in which an error occurs in the torque sensor (following MDPS motor current [A]) are substantially similar to each other.

Therefore, in case of emergency steering due to an error in the torque sensor, the MDPS system can be driven through the motor command current detected in accordance with the present embodiment.

As such, the emergency steering apparatus and method of the MDPS system in accordance with the embodiments of the present invention can maintain a steering force even when the torque sensor of the MDPS fails, thereby assuring a driver's safety.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An emergency steering apparatus of an MDPS (Motor Driven Power Steering) system, comprising:
   a steering angle sensor configured to sense a steering angle of a steering wheel;
   a vehicle speed sensor configured to sense a vehicle speed;

an assist rack force detector configured to detect an assist rack force of the MDPS system using the steering angle sensed by the steering angle sensor and the vehicle speed sensed by the vehicle speed sensor, the assist rack force detector comprising an assist rack force calculator configured to calculate an assist rack force based on a total rack force and a driver max steering force by subtracting the driver max steering force from the total rack force, wherein the total rack force is calculated based on a self-aligning torque, wherein the driver max steering force is calculated by the assist rack force calculator using pinion efficiency, driver maximum torque, and pinion gear ratio; and a command current detector configured to detect a command current of a motor using the assist rack force detected by the assist rack force detector.

2. The emergency steering apparatus of claim 1, wherein the assist rack force detector further comprises:

a total rack force calculator configured to calculate a total rack force required for a driver to operate a steering wheel, using the steering angle sensed by the steering angle sensor and the vehicle speed sensed by the vehicle speed sensor.

3. The emergency steering apparatus of claim 2, wherein the total rack force calculator calculates a side slip angle and yaw rate of the vehicle, using the steering angle sensed by the steering angle sensor and the vehicle speed sensed by the vehicle speed sensor, calculates the self-aligning torque based on a detected side slip angle and yaw rate of the vehicle, and then calculates the total rack force based on the calculated self-aligning torque.

4. The emergency steering apparatus of claim 3, further comprising a command current corrector configured to correct a command current according to the yaw rate calculated by the total rack force calculator.

5. The emergency steering apparatus of claim 4, wherein the command current corrector compares the yaw rate calculated by the total rack force calculator to the yaw rate sensed by the yaw rate sensor, and adjusts a magnitude of the command current according to the comparison.

6. The emergency steering apparatus of claim 5, wherein the command current corrector compares patterns or magnitudes of the yaw rate calculated by the total rack force calculator and the yaw rate sensed by the yaw rate sensor, and determines a behavior of the vehicle as any one of normal turn, over-steer and under-steer, according to a similarity therebetween.

7. The emergency steering apparatus of claim 6, wherein the command current corrector determines that the behavior of the vehicle is over-steer, when the yaw rate sensed by the yaw rate sensor is larger than the yaw rate calculated by the total rack force calculator, and determines that the behavior of the vehicle is under-steer, when the yaw rate sensed by the yaw rate sensor is smaller than the yaw rate calculated by the total rack force calculator.

8. The emergency steering apparatus of claim 5, wherein the command current corrector adjusts the magnitude of the command current by applying a difference between the yaw rate calculated by the total rack force calculator and the yaw rate sensed by the yaw rate sensor to a preset tuning map.

9. The emergency steering apparatus of claim 2, wherein the assist rack force calculator calculates the ratio of the assist rack force with respect to the total rack force calculated by the total rack force calculator, in order to calculate the assist rack force.

10. The emergency steering apparatus of claim 9, wherein the assist rack force calculator calculates the assist rack force by multiplying the ratio of the assist rack force by the total rack force calculated by the total rack force calculator.

11. The emergency steering apparatus of claim 1, further comprising a command current corrector configured to previously store a gain adjustment table based on the vehicle speed sensed by the vehicle speed sensor, and correct the command current detected by the command current detector by applying a gain of the gain adjustment table according to the vehicle speed sensed by the vehicle speed sensor.

12. An emergency steering method of an MDPS system, comprising:

calculating, by an assist rack force detector, a total rack force required for a driver to operate a steering wheel, using a steering angle and vehicle speed which are sensed by a steering angle sensor and a vehicle speed sensor, respectively, and calculating an assist rack force based on the calculated total rack force and a driver max steering force by subtracting the driver max steering force from the total rack force, wherein the total rack force is calculated based on a self-aligning torque, wherein the driver max steering force is calculated by an assist rack force calculator using pinion efficiency, driver maximum torque, and pinion gear ratio; and detecting, by a command current detector, a command current of a motor using the assist rack force detected by the assist rack force detector.

13. The emergency steering method of claim 12, wherein in the calculating of the total rack force, a total rack force calculator calculates a side slip angle and yaw rate of the vehicle, using the steering angle sensed by the steering angle sensor and the vehicle speed sensed by the vehicle speed sensor, calculates the self-aligning torque based on a detected side slip angle and yaw rate of the vehicle, and then calculates the total rack force based on the calculated self-aligning torque.

14. The emergency steering method of claim 12, further comprising correcting, by a command current corrector, a command current according to a yaw rate calculated by the total rack force calculator.

15. The emergency steering method of claim 14, wherein in the correcting of the command current, the command current corrector compares the yaw rate calculated by the total rack force calculator and the yaw rate sensed by a yaw rate sensor, and adjusts a magnitude of the command current according to the comparison.

16. The emergency steering method of claim 15, wherein in the correcting of the command current, the command current corrector compares patterns or magnitudes of the yaw rate calculated by the total rack force calculator to the yaw rate sensed by the yaw rate sensor, and determines a behavior of the vehicle as any one of normal turn, over-steer and under-steer, according to a similarity therebetween.

17. The emergency steering method of claim 16, wherein in the correcting of the command current, the command current corrector determines that the behavior of the vehicle is over-steer, when the yaw rate sensed by the yaw rate sensor is larger than the yaw rate calculated by the total rack force calculator, and determines that the behavior of the vehicle is under-steer when the yaw rate sensed by the yaw rate sensor is smaller than the yaw rate calculated by the total rack force calculator.

18. The emergency steering method of claim 15, wherein in the correcting of the command current, the command current corrector adjusts the magnitude of the command current by applying a difference between the yaw rate calculated by the total rack force calculator and the yaw rate sensed by the yaw rate sensor to a preset tuning map.

19. The emergency steering method of claim 12, wherein in the calculating of the assist rack force,
the assist rack force calculator calculates the ratio of the assist rack force with respect to the total rack force calculated by the total rack force calculator, in order to calculate the assist rack force.

20. The emergency steering method of claim 19, wherein in the calculating of the assist rack force,
the assist rack force calculator calculates the assist rack force by multiplying the ratio of the assist rack force by the total rack force calculated by the total rack force calculator.

* * * * *